(12) United States Patent
Fan et al.

(10) Patent No.: US 12,259,490 B1
(45) Date of Patent: Mar. 25, 2025

(54) MULTI-ANTENNA SINGLE-STATION STEREOSCOPIC-ARRANGEMENT ULTRA-SHORT BASELINE LIGHTNING LOCATION METHOD AND RELATED DEVICE

(71) Applicants: Northwest Institute of Eco-Environment and Resources, Chinese Academy of Sciences, Lanzhou (CN); Hexi University, Zhangye (CN)

(72) Inventors: Xiangpeng Fan, Lanzhou (CN); Yijun Zhang, Lanzhou (CN); Yajun Li, Zhangye (CN); Yuhui Zhang, Lanzhou (CN); Guo Zhao, Lanzhou (CN); Tong Zhang, Lanzhou (CN)

(73) Assignees: Northwest Institute of Eco-Environment and Resources, Chinese Academy of Sciences, Lanzhou (CN); Hexi University, Zhangye (CN)

( * ) Notice: Subject to any disclaimer, the term of this patent is extended or adjusted under 35 U.S.C. 154(b) by 0 days.

(21) Appl. No.: 18/776,507

(22) Filed: Jul. 18, 2024

(30) Foreign Application Priority Data

Feb. 26, 2024 (CN) .......................... 202410208701.8

(51) Int. Cl.
*G01S 5/14* (2006.01)
*G01S 5/02* (2010.01)
*H01Q 21/28* (2006.01)

(52) U.S. Cl.
CPC ............... *G01S 5/14* (2013.01); *G01S 5/021* (2013.01); *G01S 5/02213* (2020.05); *H01Q 21/28* (2013.01); *G01S 2205/01* (2020.05)

(58) Field of Classification Search
CPC ........ G01S 5/14; G01S 5/02213; G01S 5/021; H01Q 21/28
(Continued)

(56) References Cited

FOREIGN PATENT DOCUMENTS

| CN | 1847876 A | 10/2006 |
|---|---|---|
| CN | 103235284 A | 8/2013 |

(Continued)

OTHER PUBLICATIONS

CN 2024102087018, Jul. 12, 2024, Chinese Office Action.
(Continued)

*Primary Examiner* — Harry K Liu
(74) *Attorney, Agent, or Firm* — Wolf, Greenfield & Sacks, P.C.

(57) ABSTRACT

The present disclosure provides a multi-antenna single-station stereoscopic-arrangement ultra-short baseline lightning location method and related devices. The method includes: adopting a multi-antenna stereoscopic arrangement to form an equilateral pentagon interferometer array without angular error and multiple equilateral triangle interferometer arrays with angular error by combining different numbers of antennas; obtaining a time difference of a same pulse signal between VHF antennas through the combinations of different antennas; using the equilateral pentagon interferometer array to conduct a two-dimensional observation without systematic error; correcting a result of a two-dimensional observation with systematic error that is obtained from the equilateral triangle arrays; and finally, using two-dimensional information obtained by the equilateral pentagon interferometer array as a reference, and performing spatial intersection with the corrected two-dimensional information obtained by multiple equilateral triangle interferometer arrays to obtain three-dimensional information.

8 Claims, 7 Drawing Sheets

(58) Field of Classification Search
USPC .......................................................... 342/451
See application file for complete search history.

(56) References Cited

FOREIGN PATENT DOCUMENTS

| CN | 113075461 A | * | 7/2021 | ......... G01R 29/0842 |
|---|---|---|---|---|
| CN | 113782984 A | | 12/2021 | |
| CN | 116482601 A | | 7/2023 | |
| CN | 109143218 B | * | 10/2023 | ............. G01S 13/42 |
| KR | 101638481 B1 | | 7/2016 | |
| KR | 20190000013 A | | 1/2019 | |

OTHER PUBLICATIONS

CN 2024102087018, Jul. 24, 2024, Chinese Notification to Grant.
Chinese Office Action dated Jul. 12, 2024 in connection with Chinese Application No. 2024102087018.
Chinese Notification to Grant dated Jul. 24, 2024 in connection with Chinese Application No. 2024102087018.
Mardiana et al., Lightning Observations and Positioning Using Broadband Interferometer. Proceedings of the 1999 International Conference on Lightning and Static Electricity (ICOLSE). SAE Technical Paper Series. 1999-01-2362. Jun. 1999. 8 pages.
Zhang et al., Experimental study on location accuracy of a 3D VHF lightning-radiation-source locating network. Science China Earth Sciences. Nov. 2015;58:2034-48.

* cited by examiner

MULTI-ANTENNA SINGLE-STATION STEREOSCOPIC-ARRANGEMENT ULTRA-SHORT BASELINE LIGHTNING LOCATION METHOD AND RELATED DEVICE

CROSS-REFERENCE TO RELATED APPLICATION

The present disclosure claims the priority to the Chinese patent application with the filing No. 2024102087018 filed with the Chinese Patent Office on Feb. 26, 2024, and entitled "MULTI-ANTENNA SINGLE-STATION STEREOSCOPIC-ARRANGEMENT ULTRA-SHORT BASELINE LIGHTNING LOCATION METHOD AND RELATED DEVICE", the contents of which are incorporated herein by reference in entirety.

TECHNICAL FIELD

The present disclosure relates to the technology field of lightning positioning, and specifically to a multi-antenna single-station stereoscopic-arrangement ultra-short baseline lightning location method (i.e., a method for locating the lightning with multi-antenna single-station stereoscopic arrangement and ultra-short baseline) and related device.

BACKGROUND ART

In the technology field of lightning detection, existing methods mainly include magnetic orientation methods, time of arrival (TOA) methods, and interferometry methods, each utilizing electromagnetic signals to locate lightning. The TOA method and the interferometry method have garnered significant attention due to their unique detection approaches. The TOA method relies on measuring the time differences of electromagnetic signals arriving at different receivers, whereas the interferometry method depends on detecting broadband very-high-frequency signals. However, these traditional methods exhibit certain limitations in practical applications. For instance, while the TOA method can provide three-dimensional information, its time resolution and spatial accuracy are limited. Further, the interferometry method, despite its high time resolution, can only offer two-dimensional information of lightning.

To obtain high-precision localization information about lightning discharge and development processes, three-dimensional lightning observation using interferometer arrays has gradually become an important direction for the exploration and research in the field of lightning observation. Currently, a dual-station interferometer array observation scheme, based on two sets of interferometer arrays deployed over long distances, has achieved three-dimensional observation of lightning discharge processes. However, when the two sets of interferometer arrays are deployed 10 kilometers apart, interferences from various factors such as local electromagnetic environment, electromagnetic signal attenuation, localization result matching, and system errors significantly limit the high-precision three-dimensional lightning localization capability of the dual-station interferometer arrays. There have also been attempts to use a multi-antenna single-station setup with an ultra-short baseline interferometer array. In practical observations, although this observation scheme can achieve three-dimensional localization of some signals to a certain extent, issues such as electromagnetic signal interference and baseline lengths being much shorter than the distance at which the lightning signal occurs cause errors in most three-dimensional localization results to spread radially, thus leading to problems such as dispersion of localization results.

SUMMARY

One objective of the present disclosure is to provide a multi-antenna single-station stereoscopic-arrangement ultra-short baseline lightning location method and related devices, which can achieve ultra-high-resolution three-dimensional localization of lightning discharge processes. The temporal resolution for locating lightning discharge events can reach the nanosecond level, and the theoretical resolution of spatial errors is improved to the decimeter level. The embodiments of the present disclosure are implemented as follows.

In the first aspect, the present disclosure provides a multi-antenna single-station stereoscopic-arrangement ultra-short baseline lightning location method. the multi-antenna single-station stereoscopic arrangement comprises an interferometer array formed by combinations of different numbers of very high frequency (VHF) antennas, wherein the interferometer array comprises an equilateral pentagon interferometer array without angular error and multiple equilateral triangle interferometer arrays with angular error; and the method comprises: collecting very high frequency radiation signals received by each VHF antenna, and determining a time difference of a same pulse signal between different VHF antennas based on the very high frequency radiation signals; using, based on the time difference of the same pulse signal between different VHF antennas, the equilateral pentagon interferometer array and the equilateral triangle interferometer arrays to perform positioning, respectively, and obtaining a set of first azimuth angle and first elevation angle and multiple sets of second azimuth angles and second elevation angles of a radiation source emitting the very high frequency radiation signals, wherein the first azimuth angle and the first elevation angle are free of systematic error, and the second azimuth angles and the second elevation angles have systematic error; correcting the multiple sets of second azimuth angles and second elevation angles to obtain multiple sets of target azimuth angles and target elevation angles; using a direction in which the first azimuth angle and first elevation angle are located as a reference direction, determining one target position point on the reference direction such that a central distance, between a ray passing through the target position point in the reference direction and rays in a reference direction determined by the multiple sets of target azimuth angles and target elevation angles, is minimized, and determining a three-dimensional coordinate of the radiation source based on the target position point, the first azimuth angle, and the second azimuth angle; and determining an occurrence time of the very high frequency radiation signals based on the three-dimensional coordinate and a time that the very high frequency radiation signals are transmitted at a speed of light to a central VHF antenna.

In the second aspect, the present disclosure provides a multi-antenna single-station stereoscopic-arrangement ultra-short baseline lightning location device. The multi-antenna single-station stereoscopic arrangement comprises an interferometer array formed by combinations of different numbers of the VHF antennas, wherein the interferometer array comprises an equilateral pentagon interferometer array without angular error and multiple equilateral triangle interferometer arrays with angular error. The device comprises: an acquisition module, configured for collecting very high frequency radiation signals received by each VHF antenna;

a preprocessing module, configured for determining a time difference of a same pulse signal between different VHF antennas based on the very high frequency radiation signals; a two-dimensional positioning module, configured for using, based on the time difference of the same pulse signal between different VHF antennas, the equilateral pentagon interferometer array and the equilateral triangle interferometer arrays to perform positioning by the interferometer, respectively; and obtaining a set of first azimuth angle and first elevation angle and multiple sets of second azimuth angles and second elevation angles of a radiation source emitting the very high frequency radiation signals, wherein the first azimuth angle and the first elevation angle are free of systematic error, and the second azimuth angles and the second elevation angles have systematic error; a correction module, configured for correcting the multiple sets of second azimuth angles and second elevation angles to obtain multiple sets of target azimuth angles and target elevation angles; and a three-dimensional positioning module, configured for using a direction in which the first azimuth angle and first elevation angle are located as a reference direction, determining one target position point on the reference direction such that a central distance, between a ray in the reference direction and rays in a reference direction determined by the multiple sets of target azimuth angles and target elevation angles, is minimized; and determining a three-dimensional coordinate of the radiation source based on the target position point, the first azimuth angle, and the second azimuth angle; and the three-dimensional positioning module is further configured for determining an occurrence time of the very high frequency radiation signals based on the three-dimensional coordinate and a time that the very high frequency radiation signals are transmitted at a speed of light to a central VHF antenna.

In the third aspect, the present disclosure provides a multi-antenna single-station stereoscopic-arrangement ultra-short baseline lightning three-dimensional location system, comprising multiple very high frequency (VHF) antennas and computer equipment, wherein the multi-antenna single-station stereoscopic arrangement comprises an interferometer array formed by combinations of different numbers of the VHF antennas, wherein the interferometer array comprises an equilateral pentagon interferometer array without angular error and multiple equilateral triangle interferometer arrays with angular error. The multiple VHF antennas are configured for receiving the very high frequency radiation signals and transmitting to the computer equipment, and the computer equipment is configured for executing the multi-antenna single-station stereoscopic-arrangement ultra-short baseline lightning location method according to any one of the embodiments above.

The embodiments of the present disclosure provide a multi-antenna single-station stereoscopic-arrangement ultra-short baseline lightning location method and related devices, which can achieve ultra-high precision single-station three-dimensional localization of lightning discharge events. A multi-antenna stereoscopic arrangement is adopted to form an equilateral pentagon interferometer array without angular error and multiple equilateral triangle interferometer arrays with angular error by combining different numbers of antennas. Then, the radiation information from each VHF antenna is collected, analyzed, and processed to obtain the time difference of the same pulse signal between different VHF antennas. Combined with each time difference, two-dimensional observation is performed by using the equilateral pentagon interferometer array and the multiple equilateral triangle interferometer arrays. Then, based on the spatial relationship between the equilateral triangle interferometer arrays and the equilateral pentagon interferometer array, the two-dimensional direction information, obtained by the multiple equilateral triangle interferometer arrays, is corrected. Finally, the two-dimensional information without systematic errors, obtained from the equilateral triangle interferometer arrays, is used as a reference, and the spatial intersection is performed with the two-dimensional information obtained from multiple equilateral triangle interferometer arrays to obtain the three-dimensional information. The present disclosure can achieve ultra-high-resolution three-dimensional localization of lightning discharge processes. The temporal resolution for locating lightning discharge events can reach the nanosecond level, and the theoretical resolution of spatial errors is improved to the decimeter level.

BRIEF DESCRIPTION OF DRAWINGS

To more clearly illustrate the technical solutions of the embodiments of the present disclosure, the following will briefly introduce the drawings used in the embodiments. It should be understood that the following drawings only show some embodiments of the present disclosure, and therefore they should not be regarded as a limitation on the scope. Those ordinary skilled in the art can also obtain other related drawings based on these drawings without inventive effort.

DETAILED DESCRIPTION OF EMBODIMENTS

Figure 1:
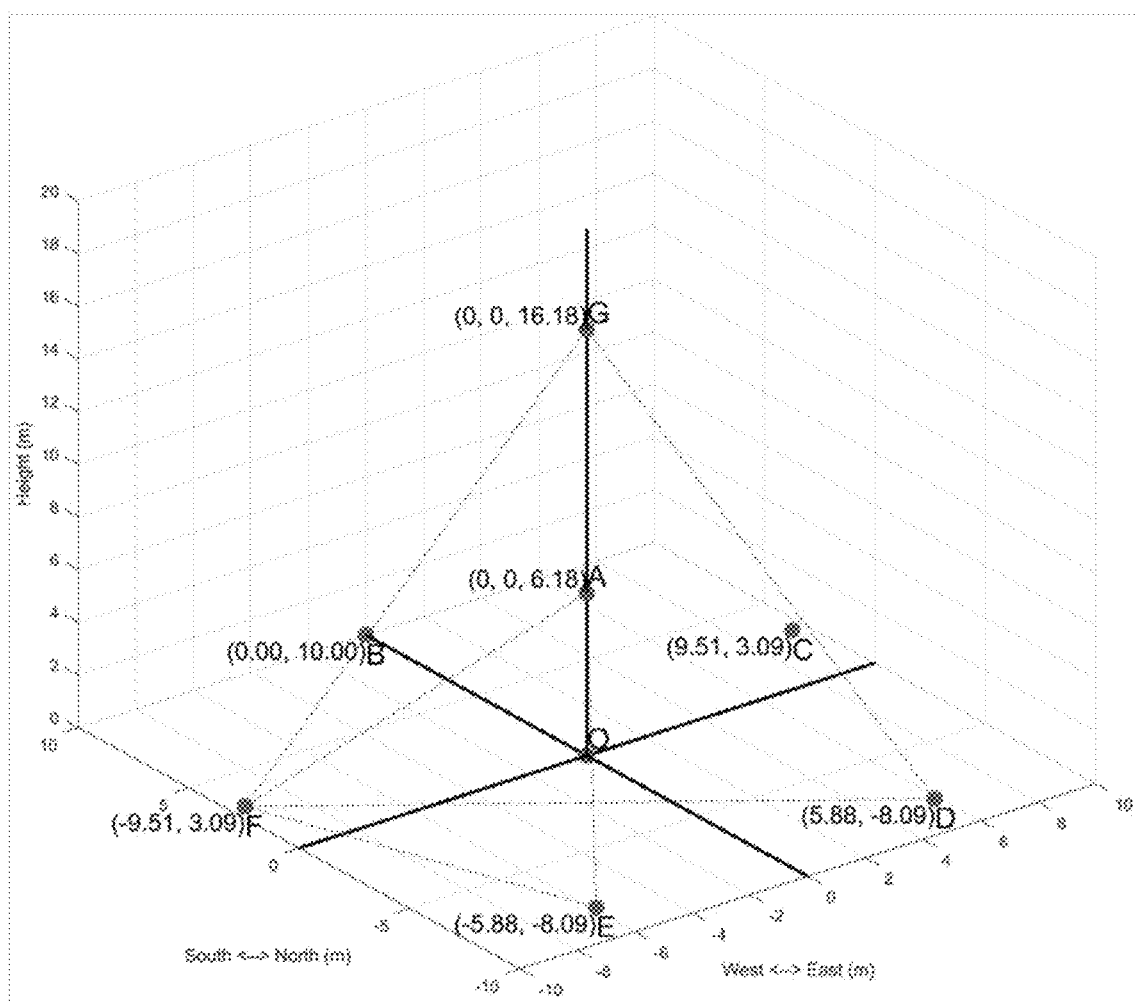
FIG. 1 shows a schematic diagram of a multi-antenna single-station stereoscopic arrangement provided by the embodiments of the present disclosure.

In order to make the objective, technical solution, and advantages of the present disclosure clearer, the following will provide a clear and complete description of the technical solution in the embodiments of the present disclosure, in conjunction with the drawings in the embodiments of the present disclosure. Obviously, the described embodiments are a part of the embodiments of the present disclosure, rather than all embodiments. The components of embodiments of the present disclosure which are generally described and illustrated in the drawings herein can be arranged and designed in a variety of different configurations.

Accordingly, the following detailed description of the embodiments of the present disclosure provided in the drawings is not intended to limit the scope of the claims of the present disclosure to be protected, but merely represents selected embodiments of the present disclosure. Based on the embodiments in the present disclosure, all other embodiments obtained by those of ordinary skill in the art without making inventive efforts are within the scope of protection of the present disclosure.

It should be noted that similar numerals and letters denote similar terms in the following drawings so that once an item is defined in one drawing, it does not need to be further discussed in subsequent drawings.

In the description of the present disclosure, it should be noted that the orientation or position relationships indicated by the terms "up", "down", "inside", "outside", etc. are the orientation or position relationships shown based on the drawings or the orientation or position relationships customarily placed in the use of the product of the present disclosure. It is only for the convenience of describing the present disclosure and simplifying its description, and does not indicate or imply that the device or element referred to must be in a specific orientation or be constructed and operated in a specific orientation, and thus should not be construed as limiting the present disclosure.

In addition, terms such as "first" and "second", are only used to distinguish the descriptive and are not to be construed as indicating or implying relative importance.

It should be noted that the features in the embodiments of the present disclosure can be combined with each other without conflict.

The embodiments of the present disclosure arrange the very high frequency (VHF) radiation detection antennas, commonly used in lightning broadband interferometer (INTF) arrays, according to the arrangement scheme shown in FIG. 1. FIG. 1 shows a schematic diagram of a multi-antenna single-station stereoscopic arrangement provided by the embodiments of the present disclosure, which comprises seven VHF antennas, antennas A to G, respectively.

Antenna A is the central VHF antenna, and is arranged above the ground directly at the origin O of coordinates. The antennas B to F are arranged around the origin O of coordinates. The distance between any two adjacent antennas B to F is L. Five antennas B to F form a highly symmetrical equilateral pentagon. The distance from each of antennas B to F to antenna A is $L_1$ (referred to as the length of the short baseline). Therefore, antenna A and any two adjacent antennas from B to F form an equilateral triangle. As a result, antennas A to F together form a set of equilateral pentagon interferometer arrays comprising six antennas with no angular error, which is denoted as ABCDEF. Antenna G is located directly above antenna A, and a height of antenna G from the origin O of coordinates enables that antenna G, together with two antennas spaced apart in antennas B to F, forms an equilateral triangle. A baseline length of the equilateral triangle is $L_2$. Consequently, antennas B to G form five sets of equilateral triangle interferometer arrays, each comprising three antennas (denoted as GBD, GCE, GDF, GEB, and GFC). The zenith directions of the cosine planes of the five equilateral triangle interferometer arrays are uniformly distributed around the axis where the origin O of coordinates and antenna G are located.

To ensure the precision of signal matching and the feasibility of antenna deployment, the short baseline length $L_1$ is controlled to be around 10 meters (for example, $L_1$=11.76 meters). This is an ultra-short baseline observation system, where the short baseline length $L_1$ is significantly smaller than that of existing three-dimensional lightning location systems internationally. Additionally, in the arrangement example shown in FIG. 1, the baseline length $L_2$ of the equilateral triangle can be set to 19.02 meters.

Due to the use of the basic positioning principle of interferometer arrays, for convenience, the antenna array composed of antennas A-G is still referred to as the INTF array. The seven VHF antennas in the INTF array have the same performance specifications, all using broadband very-high-frequency (50-180 MHz) RF receiving antennas. The time series waveform of each receiver is synchronously recorded at a sampling rate of 400 MHz/s and a sampling precision of 14 bits, with an initial time resolution of 2.5 nanoseconds. The performance can be improved based on the capabilities of future available acquisition cards. On one hand, this ensures that ABCDEF still forms a regular hexagon structure, and on the other hand, it provides observation margins in the vertical direction for the antenna array.

In the embodiment of the present disclosure, antenna A serves as the central antenna and is mounted above the ground, with relatively short baseline lengths formed with any other antenna, which can significantly enhance the accuracy of signal matching between different antennas. The mounting position of antenna G, on one hand, provides five sets of equilateral triangle interferometer arrays, and also ensures the observation margins in the vertical direction for the antenna array. On the other hand, when antenna G serves as the central antenna for the five interferometer arrays GBD, GCE, GDF, GEB, and GFC, the zenith directions of the cosine planes of the five interferometer arrays are evenly distributed around axis OG. The distribution curves of their respective systematic errors will be arranged in equiangular circles according to the true incident direction of the radiation signal. The embodiments of the present disclosure can fully utilize the inherent error distribution characteristics of the five sets of equilateral triangle interferometer arrays to eliminate the influence of systematic errors and obtain precise three-dimensional positioning information.

In the embodiments of the present disclosure, the fast electric field change meter (abbreviated as fast antenna, FA) also participates in the joint network observation with the INTF. It is specifically configured for measuring changes in the vertical electric field on the ground and has a decay constant of 100 μs. The fast antenna has high sensitivity in the frequency range from 3 kHz to over 20 MHz. This observation scheme significantly enhances the precise matching between the VHF radiation signals and low-frequency electric field waveforms generated during lightning discharges, which is particularly important for analyzing the development details of microsecond-level discharge events. It should be noted that the fast electric field change meter is mainly configured to identify the physical processes of lightning discharges and is not configured for lightning positioning.

Figure 2:
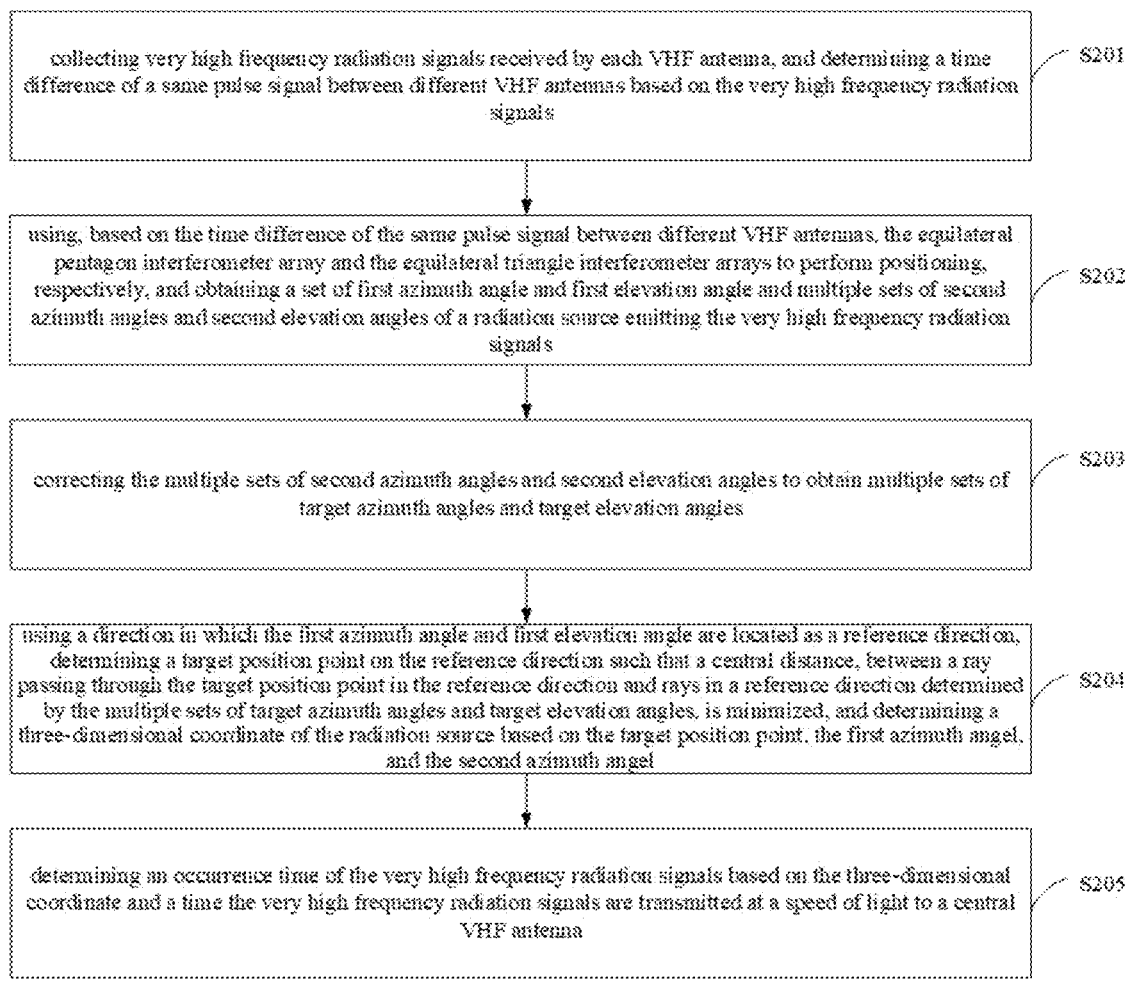
FIG. 2 shows a schematic flowchart of an ultra-short baseline lightning location method based on a multi-antenna single-station stereoscopic arrangement provided by the embodiment of the present disclosure.

Based on the multi-antenna single-station stereoscopic arrangement shown in FIG. 1, the embodiments of the present disclosure provide an ultra-short baseline lightning three-dimensional positioning method. Referring to FIG. 2, FIG. 2 shows a schematic flowchart of an ultra-short baseline lightning location method based on a multi-antenna single-station stereoscopic arrangement provided by the embodiments of the present disclosure. The method is executed by high-performance computer equipment and can include the following steps.

S201: collecting very high frequency radiation signals received by each VHF antenna, and determining a time difference of a same pulse signal between different VHF antennas based on the very high frequency radiation signals.

S202: using, based on the time difference of the same pulse signal between different VHF antennas, the equilateral pentagon interferometer array and the equilateral triangle interferometer arrays to perform positioning, respectively, and obtaining a set of first azimuth angle and first elevation angle and multiple sets of second azimuth angles and second elevation angles of a radiation source emitting the very high frequency radiation signals, wherein the first azimuth angle and the first elevation angle are free of systematic error, and the second azimuth angles and the second elevation angles have systematic error.

S203: correcting the multiple sets of second azimuth angles and second elevation angles to obtain multiple sets of target azimuth angles and target elevation angles.

S204: using a direction in which the first azimuth angle and first elevation angle are located as a reference direction, determining a target position point on the reference direction such that a central distance, between a ray passing through the target position point in the reference direction and rays in a reference direction determined by the multiple sets of target azimuth angles and target elevation angles, is minimized, and determining a three-dimensional coordinate of the radiation source based on the target position point, the first azimuth angle, and the second azimuth angles.

S205: determining an occurrence time of the very high frequency radiation signals based on the three-dimensional coordinate and a time that the very high frequency radiation signals are transmitted at a speed of light to a central VHF antenna.

In the step S201 to step S205, a multi-antenna stereoscopic arrangement is adopted to form an equilateral pentagon interferometer array without angular error and multiple equilateral triangle interferometer arrays with angular error by combining different numbers of antennas. Then, the very high frequency radiation information from each VHF antenna and the fast electric field change meter is collected, analyzed, and processed to obtain the time difference of the same pulse signal between different VHF antennas. Combining each time difference, two-dimensional observation is performed by using the equilateral pentagon interferometer array and the multiple equilateral triangle interferometer arrays. Then, based on the spatial relationship between the equilateral triangle interferometer arrays and the equilateral pentagon interferometer array, the two-dimensional direction information, obtained by the multiple equilateral triangle interferometer arrays, is corrected. Finally, the two-dimensional information without systematic errors, obtained from the equilateral pentagon interferometer array, is used as a reference, and the spatial intersection is performed with the two-dimensional information obtained from multiple equilateral triangle interferometer arrays to obtain the three-dimensional information. The present disclosure can achieve ultra-high-resolution three-dimensional localization of lightning discharge processes. The temporal resolution for locating lightning discharge events can reach the nanosecond level, and the theoretical resolution of spatial errors is improved to the decimeter level.

Each of these steps is described in detail below.

As in the embodiment shown in FIG. 1, in an optional embodiment, step S201 can be implemented as follows.

Step a1: collecting the very high frequency radiation signals received by each VHF antenna through an acquisition card, and performing preprocessing on the very high frequency radiation signals.

In the embodiments of the present disclosure, a high-speed data acquisition card with a sampling frequency of 400 MHz can be used to collect VHF radiation signals from each VHF antenna.

As mentioned earlier, the fast electric field change meter also participates in the joint network observation with the INTF. Like the INTF array antennas, the electric field change signal of the fast electric field change meter can also be synchronously recorded by another acquisition card with the same sampling rate and accuracy. Therefore, in the specific implementation process, the computer equipment can integrate two high-speed data acquisition cards, each with a sampling frequency of 400 MHz and a total of 8 channels, to collect the VHF radiation signals from each VHF antenna and the electric field change signal from one fast electric field meter at a high speed with a precision of 14 bits.

Simultaneously, it is necessary to use high-precision GPS clock synchronization technology to ensure the time synchronization accuracy between the two acquisition cards. This method, which combines hardware triggering with software algorithms, can further reduce time deviations. Additionally, the 400 MHz high-speed acquisition cards generate a massive amount of data, posing significant demands on the data processing and storage systems. Therefore, a high-performance computing platform, large-capacity storage devices, and parallel processing technology can be used to enhance data processing speed.

In practical implementation, since the baseline length of any antenna combination in the antenna array does not exceed 20 meters, to reduce the impact of data lines on signal acquisition, the computer equipment can be provided with an air-conditioning case that is arranged in an open area at the center of the multi-antenna array.

In the embodiments of the present disclosure, the preprocessing operations include signal feature analysis, signal high-rate upsampling, high-frequency signal truncation, and noise reduction.

Signal feature analysis employs the DBM_EEMD method to analyze the VHF radiation signals generated by lightning. The ambient background noise covered in the VHF radiation signals and the key components of the lightning VHF radiation signals containing spurious noise are tested. This forms the basis for subsequent signal matching to determine the time difference at which the same pulse signal arrives at each VHF antenna. The DBM_EEMD algorithm is an advancement based on the ensemble empirical mode decomposition (EEMD) algorithm. By performing double-sided bidirectional mirror (DBM) extension on the signal to be decomposed, it optimizes signal characteristics and enhances the noise reduction performance of the algorithm, particularly improving the accuracy of extraction of the weak pulse signal.

Figure 3:
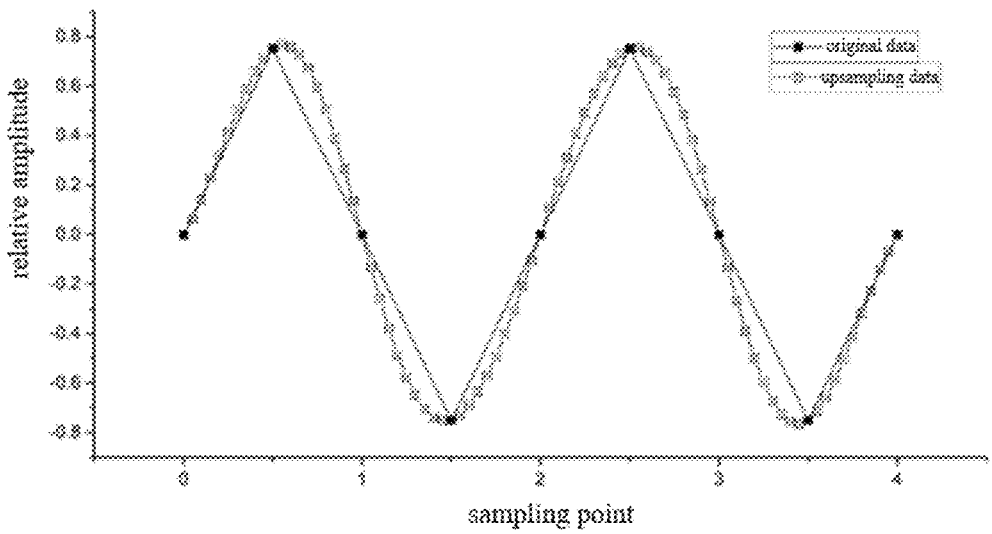
FIG. 3 shows a schematic diagram comparing an original data and an upsampling data provided by the embodiment of the present disclosure.

Before performing signal high-rate upsampling, considering that the INTF antennas operate in the VHF frequency band, the used acquisition card with a sampling rate of 400 M only allows the ratio of the sampling rate to the cutoff frequency to be only slightly higher than 2 (400/180). Even if acquisition cards with higher sampling rates are used in the future, the ratio will be difficult to exceed 10 in a short period, resulting in the detected VHF radiation signals as shown in the original data in FIG. 3, wherein FIG. 3 shows a schematic diagram comparing an original data and an upsampling data provided by the embodiment of the present disclosure. The original data is presented as a polyline form composed of scattered points every 2.5 nanoseconds. This polyline waveform is non-differentiable and cannot be directly optimized and filtered using DBM_EEMD. Moreover, due to the discrete nature of VHF radiation signals, the measurements within a narrow window are very limited. This makes it difficult to achieve the expected signal-matching effect when calculating the correlation coefficient of window waveforms on different antennas using the cross-correlation method, as the error is quite significant. Although the time resolution of the waveform has reached 2.5 nanoseconds, to achieve decimeter-level or even higher spatial resolution for three-dimensional positioning, the time resolution is still insufficient. To address the aforementioned issues, the embodiments of the present disclosure provide a method that employs multi-phase filter technology to perform high-rate upsampling on the original VHF radiation signals, which achieves high-rate sampling of the original VHF radiation signals (e.g., 100-500 times). This significantly enhances the time resolution of the signals and improves the non-differentiability of the original signals, which not only increases the accuracy of DBM_EEMD decomposition and reconstruction of the VHF radiation signals but also enhances the effectiveness of cross-correlation analysis between signals from different antennas.

After determining the main characteristics of the VHF radiation signals through signal feature analysis, the embodiments of the present disclosure use a band-pass filter constructed based on DBM_EEMD to perform quality control and reconstruction of the VHF radiation signals, thereby retaining the high-frequency signal components in the VHF radiation signals. This effectively improves the accuracy of waveform matching and helps more precisely capture the pulse peak times. This is essential to find the time difference of the same pulse signal between different antennas and thus to achieve precise localization of the radiation source.

It is understandable that, for VHF radiation signals containing noise, although some real signal components are lost after processing with the aforementioned band-pass filter, this sacrifice of some signal components is extremely valuable for accurately locating lightning discharge events. The reason is that only a minimal amount of noise components remain in the signal, which significantly reduces the impact of noise. The signal components after band-pass filtering are relatively simple and have a narrow bandwidth, thus effectively enhancing the accuracy of signal matching and helping to significantly improve the richness and accuracy of pulse information extraction in the waveform.

Step a2: performing signal matching on the preprocessed very high frequency radiation signals received by all the VHF antennas to determine a peak time when the same pulse signal arrives at each VHF antenna, and determining the time difference based on the peak time corresponding to each of the two different VHF antennas.

With respect to step a2 above, the implementation provided in the embodiment of the present disclosure comprises the following steps.

Step a2-1: using generalized cross-correlation technology to match the very high frequency radiation signals on different VHF antennas, wherein during a matching process, a to-be-matched signal on each VHF antenna consists of one main window and two auxiliary windows; for the to-be-matched signal of a central antenna, values of its two auxiliary windows are set to 0; and for other VHF antennas except for the center antenna, a scale of the auxiliary window is determined by a length of the baseline formed with the central antenna.

In the embodiments of the present disclosure, through the aforementioned step a2, after completing the original VHF radiation signal feature analysis, upsampling, and signal quality control and reconstruction using a band-pass filter constructed by DBM_EEMD, generalized cross-correlation technology can be used to match the signals from different antennas. This prepares for the further identification and matching of pulse signals. Therefore, the embodiment of the present disclosure first provides a signal-matching method based on variable-scale windows. For ease of understanding, referring to FIG. 4, FIG. 4 shows a schematic diagram of a generalized cross-correlation waveform matching method combining a main window and a variable auxiliary window provided by the embodiments of the present disclosure.

Figure 4:
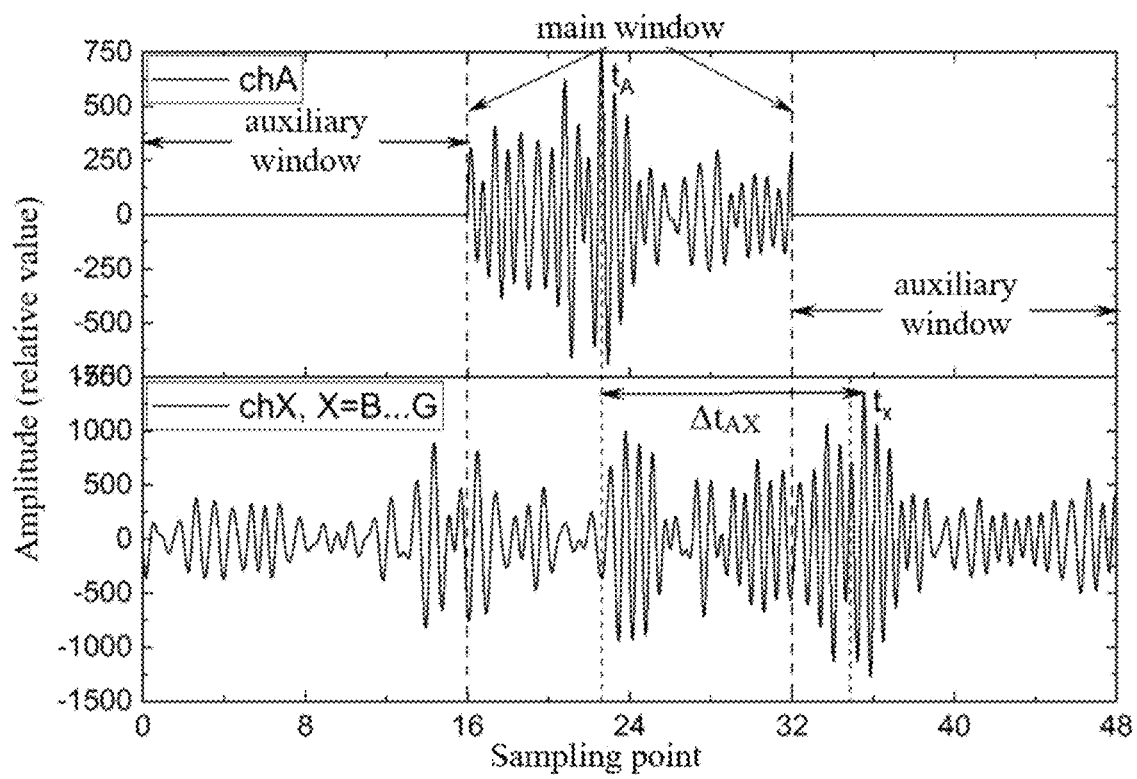
FIG. 4 shows a schematic diagram of a generalized cross-correlation waveform matching method combining a main window and a variable auxiliary window provided by the embodiments of the present disclosure.

As shown in FIG. 4, in the embodiment of the present disclosure, the VHF radiation signal of 48 sampling points is divided into three parts: the main window located in the middle segment, with a length of 16 sampling points, and an auxiliary window of the same length on each side. Combined with the multi-antenna single-station stereoscopic arrangement shown in FIG. 1, in the specific implementation process, taking antenna A (chA) as the central antenna, the main window intercepts 16 sampling points, and the auxiliary windows are set to 0 values. For antennas B to G (chX, X=B . . . G), although the main window intercepts the real signal of the same time period as chA, their auxiliary windows are extended to the real signals of N sampling points, where the length of the auxiliary windows is calculated based on the optical path difference between the baselines formed by the current antenna and the central antenna.

For example, assuming the short baseline length $L_1$ in FIG. 1 is 11.76 meters, when the VHF radiation signal generated by lightning is received by the INTF antennas, the resulting time difference will not exceed 39 nanoseconds (the time required for light to travel 11.76 meters). At a sampling rate of 400 M (time resolution of 2.5 nanoseconds), this corresponds to approximately 16 sampling points of deviation (applicable to antennas B, C, D, E, and F). For antenna G, assuming the length between A and G is 10 meters, the upper limit of its auxiliary window is 14 sampling points. Although there is only a difference of two sampling points compared to other antennas, even a mismatch of one sampling point can severely impact positioning accuracy for VHF signals at a 400 M sampling rate in the ultra-short baseline arrangement shown in FIG. 1. Therefore, the length of the auxiliary window is set to 16 or 14 sampling points. To maintain a similar weight between the main window and auxiliary windows, the length of the main window is also set to 16 sampling points.

This combination of the main window and variable auxiliary windows has several advantages. First, it avoids the potential reuse of pulse signals in positioning. On the time axis of chA, when traversing the signal with 16 sampling points (40 nanoseconds), the signals on other antennas (main window and two auxiliary windows) are matched with the main window signal shape of chA using the generalized cross-correlation method, thereby avoiding repeated positioning information. Second, this combination actually breaks through the minimum window width limitation of the window matching algorithm, which is limited based on the INTF antenna baseline length. Particularly, the setting where chA only has a main window without auxiliary windows significantly improves the accuracy of window matching using generalized cross-correlation. This provides higher accuracy for matching pulse signals and extracting information on a smaller time scale.

Step a2-2: using a micro-scale window whose width is a preset value to traverse matching results, and determining, when a number of pulse peaks within the micro-scale window are consistent with a number of the VHF antennas, that pulse on all the VHF antennas are detected.

For matching and information extraction of pulse signals on a smaller time scale, the embodiment of the present disclosure also provides a method for pulse extraction using a micro-scale window. That is, after signal matching based on the variable-scale window, a micro-scale window with a width of preset nanoseconds is used to traverse the window, where the specific value of the preset nanoseconds can be determined based on the signal characteristics, such as 5 nanoseconds. The goal is to find a specific combination of seven pulses within the micro-scale window to accurately extract the time for matching the pulse peak.

Figure 5:
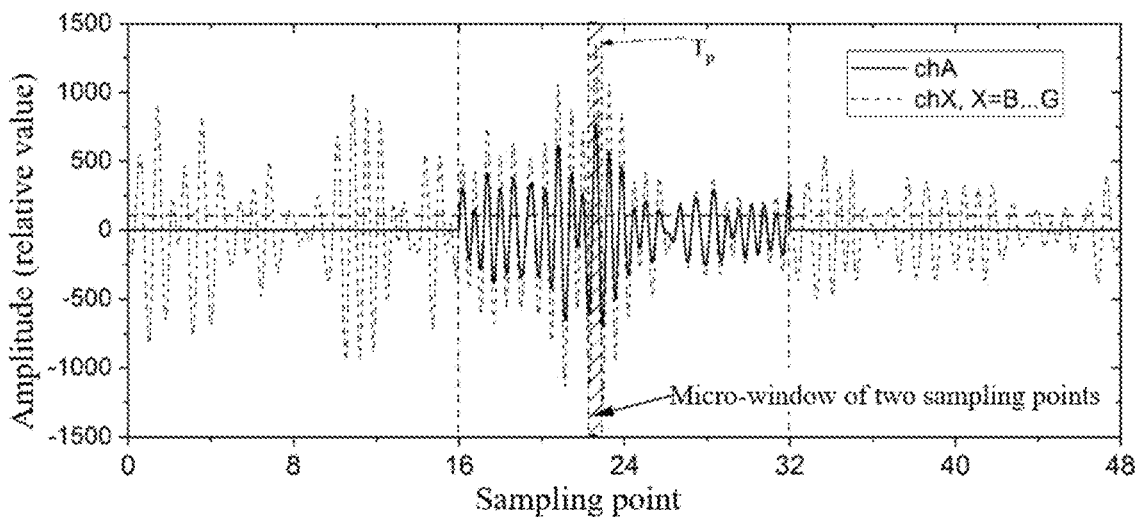
FIG. 5 shows a schematic diagram of VHF waveforms matched together by generalized cross-correlation technology provided by the embodiments of the present disclosure.

Continuing as shown in FIG. 4, when the signals of antennas B to G (chX, X=B ... G) are respectively shifted by $\Delta t_{AX}$ relative to the signal of antenna chA, window matching is achieved, where its results are demonstrated in FIG. 5. FIG. 5 shows a schematic diagram of VHF waveforms matched together by generalized cross-correlation technology provided by the embodiments of the present disclosure. In previous interferometer positioning techniques and long-baseline three-dimensional lightning location systems LMA, the time difference $\Delta t_{AX}$ is configured to obtain the direction or location information of the radiation source. However, in window-based localization techniques, the correlation of the time series within the window on the two antennas is mainly affected by one or a few strong pulse signals. Due to the interference from other signals within the window, the time delay between antennas calculated using the generalized cross-correlation method usually deviates from the peak time of the strongest pulse within the window.

Continuing as shown in FIG. 5, in the specific implementation process, all pulse peak times, with peak values greater than the set threshold, can be identified first in the main window of the central station chA. For example, in FIG. 5, the strongest pulse on chA has a peak time of Tp. Then, with Tp as the center, a micro-scale window with a width of 5 nanoseconds is constructed to cover both chA and chX (X=B ... G). In chX (X=B ... G), it is checked whether there are pulse peaks within the window. When pulses are detected on the signals of all seven antennas in the micro-scale window within 5 nanoseconds, the next step is executed.

Step a2-3: performing similarity judgment on waveforms of the pulses detected on all the VHF antennas; extracting, when a correlation coefficient of the pulses on each two VHF antennas is greater than a preset threshold value, the peak times of the pulses on all the VHF antennas, and determining the time difference based on the peak times corresponding to two different VHF antennas.

In the embodiment of the present disclosure, it is necessary to first perform similarity judgment on all pulse waveforms preliminarily matched in the above steps. Specifically, using the successfully paired pulse peak times (TpA, TpB, ..., TpG) as the centers, waveforms with a width of 10 nanoseconds are extracted, and their correlation coefficients are calculated. Only when the correlation coefficients between the pairs of pulse waveforms are all greater than 0.8, are these pulse signals considered to originate from the same "lightning" event. The peak times of the pulses confirming successful pairing are TpA, TpB, ..., and TpG, respectively. In turn, the time difference between the same pulse information arriving at the different two antennas can be determined from these peak times. For example, taking chA and chB as an example, the time difference between the same pulse signal arriving at antennas A and B is $\Delta t_{AB} = T_{pA} - T_{pB}$. An antenna array consisting of n antennas will generate $$C_n^m = \frac{n!}{m!(n-m)!}$$

groups of time differences $\tau_{ij}$, where $\tau_{ij}$ is the time difference of the same radiation source arriving at the i-th and j-th antennas, n is the number of antennas, and m=2.

Continuing with the embodiment shown in FIG. 2, in step S202, the arrival times of the matched pulses from the seven stations can be used for group interferometer positioning. Referring to FIG. 1, a regular pentagon interferometer array (ABCDEF) with six antennas can be used to obtain an angle-error-free two-dimensional direction (Az_0, El_0) of the pulse signal. Additionally, five equilateral triangle interferometer arrays with angular errors (GBD, GCE, GDF, GEB, GFC), each containing three antennas, can be used to obtain the angle-error two-dimensional directions ($Az_i$, $El_i$; i=1, 2 ... 5) of the pulse signal.

To facilitate understanding, the basic common interferometer positioning method is first introduced.

Figure 6A:
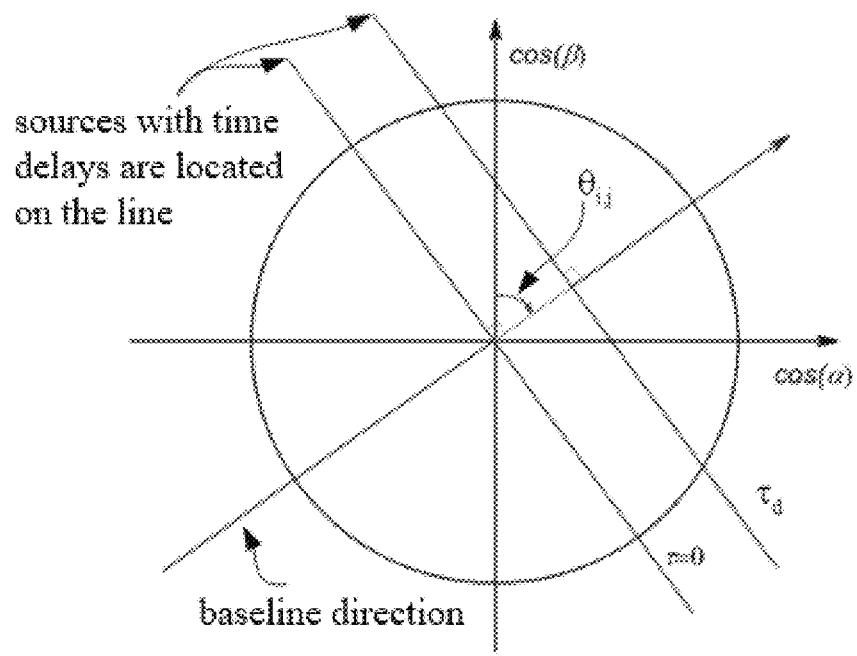
FIG. 6a shows a schematic diagram for determining two-dimensional information of a source.

In an array with at least three antennas deployed, the number of baseline combinations is given by n(n−1)/2n. As shown in FIG. 6a, FIG. 6a shows a geometric schematic for determining the two-dimensional position of a source. The baseline direction and the source with a time delay τ are shown in FIG. 6a, respectively. The difference $\tau_d$ in arrival time between two antennas defines a straight line perpendicular to the baseline in the cosine projection. Its mathematical expression is shown in equation (1):

$$\cos(\alpha)\sin(\theta_{ij}) + \cos(\beta)\cos(\theta_{ij}) = \frac{c\tau_{ij}}{d_{ij}} \quad (1)$$

where $\cos(\alpha)$ and $\cos(\beta)$ are the cosines of the direction angles of the baseline formed by the i-th and j-th antennas, which are the unknown parameters; $\theta_{ij}$ is the angle between the baseline formed by the i-th and j-th antennas and the due north direction; $d_{ij}$ is the length of the baseline formed by the i-th and j-th antennas; $\tau_{ij}$ is the time difference of the same radiation source arriving at the i-th and j-th antennas; and c is the speed of light. As long as the time delay is accurate, equation (1) can be solved.

Figure 6B:
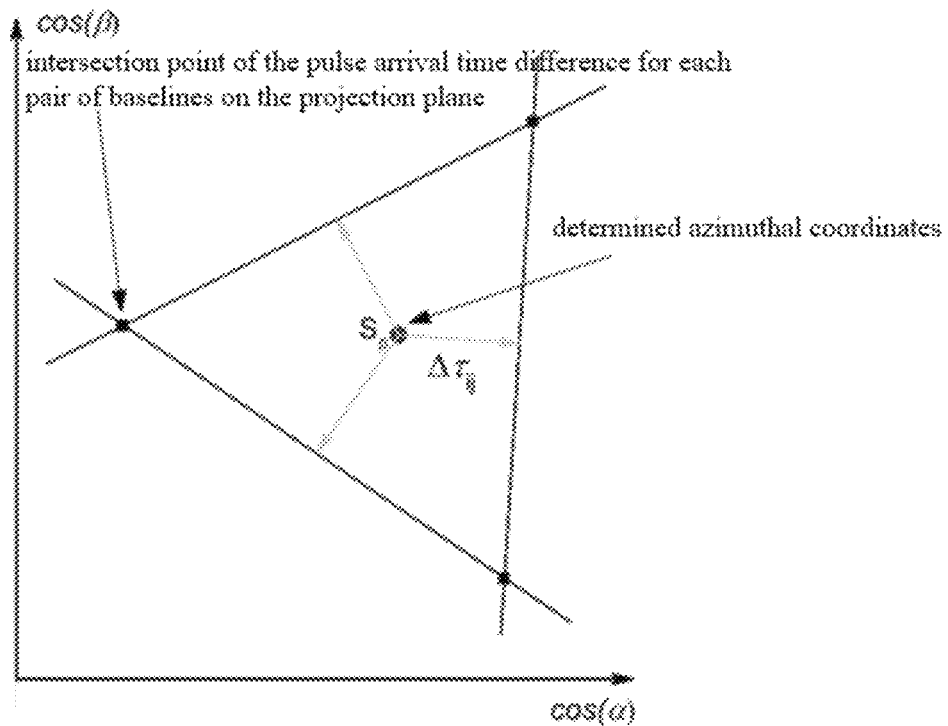
FIG. 6b shows a schematic diagram of a method for assessing localization error using a three-antenna array as an example.

In practical implementation, the nonlinear least squares method can be used to solve equation (1), wherein the method is widely applied in three-dimensional lightning location systems. In an interferometer array detection system, an antenna array of n antennas can form n(n−1)/2 equations in the form of equation (1). Equation (1) has two unknown parameters cos(α) and cos(β). Therefore, when three antennas form three baselines, equation (1) has super-solution. The result obtained by solving the nonlinear least squares method is the projection of the radiation source onto the cosine plane, satisfying equation (2):

$$\chi^2 = \frac{2}{n(n-1)} \sum_{i=1,j=i+1}^{n} \frac{(\tau_{ij}^{obs} - \tau_{ij}^{fit})^2}{\Delta t_{rms}^2} = \frac{2}{n(n-1)} \sum_{i=1,j=i+1}^{n} \frac{(\Delta \tau_{ij})^2}{\Delta t_{rms}^2} \quad (2)$$

where n is the number of antennas, $\Delta t_{rms}$ represents the error level of the pulse peak time extraction, and the error estimate of the time difference of INTF at a 400M sampling frequency does not exceed 2.5 nanoseconds (1 sampling point). $\tau_{ij}^{fit}$ represents the time difference of the same radiation source arriving at the i-th and j-th antennas obtained by nonlinear least squares iterative calculation, and $\tau_{ij}^{obs}$ represents the observed time difference of the same radiation source arriving at the i-th and j-th antennas. The nonlinear least squares method solves for a set of cos(α) and cos(β) that minimize the value of equation (2). As shown in FIG. 6b, FIG. 6b shows a schematic diagram of a method for assessing localization error using a three-antenna array as an example. The error is a calculation error caused by slight time errors, which is different from the systematic error involved in the embodiments of the present disclosure. This is because the basic principle of interferometer positioning is based on the assumption that the radiation signal is transmitted as a plane wave, while in reality, the radiation signal is transmitted as a spherical wave, and he plane wave assumption will lead to systematic errors. The distribution characteristics of the systematic error are related to the number of antennas and the arrangement of the antennas, wherein the stronger the symmetry of the antenna arrangement, the smaller the systematic error. The systematic error of an equilateral triangle (three antennas) interferometer is periodically distributed. When the number of antennas increases to more than five and the antenna arrangement forms a highly symmetrical structure in central symmetry and axial symmetry, the systematic error is completely eliminated.

Continuing as shown in FIG. 6b, it illustrates an intersection point of the pulse arrival time differences for each pair of baselines on the projection plane, and the intersection point (cos(α), cos(β))). According to the two-dimensional coordinates on the cosine projection plane $S_p$ (cos(α), cos(β))), the spatial two-dimensional coordinates of the pulse radiation source can be calculated, as shown in equation (3):

$$Az = \arctan\left(\frac{\cos(\alpha)}{\cos(\beta)}\right) \quad (3)$$

$$El = \arccos\left(\frac{\cos(\beta)}{\cos(Az)}\right)$$

According to the above basic general solution method, the embodiment of the present disclosure first uses a six-antenna (ABCDEF) interferometer array, taking antenna A as the reference, to obtain the first azimuth angle and first elevation angle (Az_0, El_0) of the radiation source. When the number of interferometer array antennas is greater than or equal to 5, and the antenna arrangement is symmetrically distributed, the systematic error of the two-dimensional positioning result is completely eliminated, so the first azimuth angle and the first elevation angle have no systematic error. Then, using a three-antenna interferometer array (GBD, GCE, GDF, GEB, GFC), taking antenna G as the reference, the second azimuth angle and second elevation angle of the radiation source are obtained, denoted as (Az$_i$', El$_i$'; i=1, 2 ... 5). When the number of interferometer array antennas is less than 5, there exists periodic systematic error in the two-dimensional positioning result, and the periodic distribution characteristic of the systematic error is related to the antenna arrangement. Therefore, the second azimuth angle and second elevation angle have systematic errors.

After obtaining the first azimuth angle and first elevation angle(Az_0, El_0) without systematic error, and multiple sets of second azimuth angles and second elevation angles with systematic error, for step S203, the correction method can include but is not limited to: establishing a correction formula for azimuth angles and elevation angles based on known parameters, such as considering system deviations, environmental influences, and other factors, to establish correction functions. The second azimuth angles and second elevation angles are then input into the functions for correction calculation to obtain target values. Additionally, by collecting multiple sets of second azimuth angles and second elevation angles under known parameters, comparison and statistics can be conducted to determine the systematic error between the azimuth angles and elevation angles and their true values. Subsequently, the second azimuth angles and second elevation angles are corrected based on the set of calibration parameters. Therefore, in the embodiment of the present disclosure, combined with the observation arrangement shown in FIG. 1, since the cosine plane of localization result of the three-antenna interferometer arrays (GBD, GCE, GDF, GEB, GFC) is parallel to the plane formed by the three antennas and is at an angle to the cosine plane formed by the antennas BCDEF, the cosine planes formed by GBD, GCE, GDF, GEB, and GFC can be rotated to be parallel with the cosine plane (i.e., the BCDEF plane) formed by ABCDEF, by using the polar coordinates of the plane formed by the three antennas and the cosine plane formed by the five antennas BCDEF. Then, the corrected target azimuth angles and target elevation angles (Az$_i$', El$_i$'; i=1, 2 ... 5) are obtained.

Based on the corrected target azimuth angles and target elevation angles (Az$_i$', El$_i$'; i=1, 2 ... 5), the three-dimensional localization of the radiation source can be executed. Continuing with the embodiment as shown in 2, in an optional embodiment, for step S204, the embodiments of the present disclosure are given as follows.

Step b1: determining a first to-be-solved ray expression by taking the origin of coordinates as a starting point, and the first azimuth angle and the first elevation angle as a direction vector; determining a second to-be-solved ray expression by taking the antenna G as a starting point, and a central azimuth angle and a central elevation angle of all the target azimuth angles and the target elevation angles as a direction vector, wherein both the first to-be-solved ray expression and the second to-be-solved ray expression comprise to-be-determined parameters.

Step b2: constructing a distance function between the first to-be-solved ray expression and the second to-be-solved ray expression, and performing nonlinear optimization on the distance function to determine a target parameter that minimizes a function value of the distance function.

Step b3: solving the first to-be-solved ray expression based on the target parameter to obtain the three-dimensional coordinate of the radiation source.

Figure 7A:
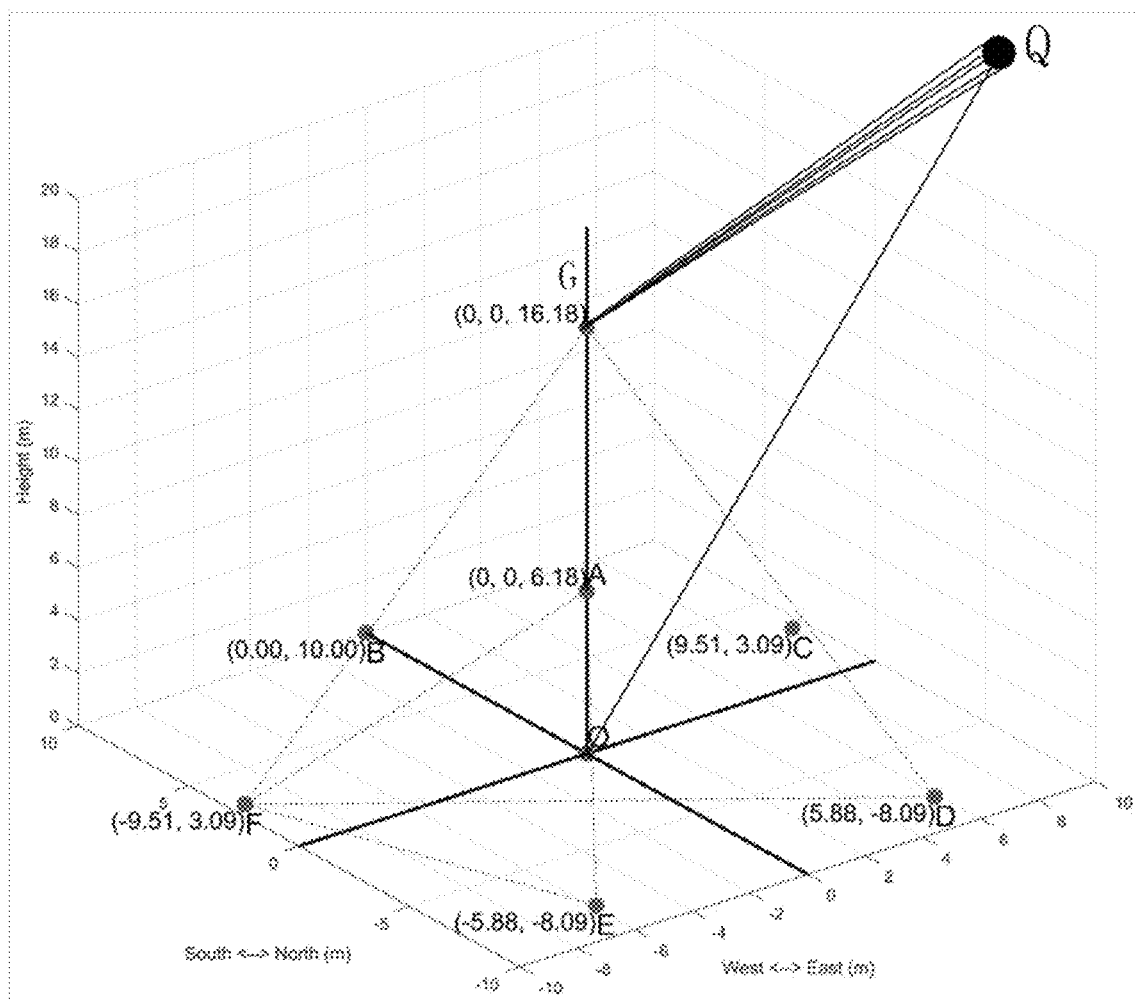
FIG. 7a shows a schematic diagram of a three-dimensional localization principle provided by the embodiments of the present disclosure.

For a convenient understanding of the above embodiments, referring to FIG. 7a, FIG. 7a shows a schematic diagram of a three-dimensional localization principle provided by the embodiments of the present disclosure. The first azimuth angle and the first elevation angle (Az_0, El_0) obtained by the interferometer array formed by ABCDEF have a systematic error of 0, theoretically pointing to the true direction of the radiation source Q. The corrected target azimuth angles and target elevation angles ($Az_i'$, $El_i'$; i= 1, 2 . . . 5) obtained by the three-antenna interferometer arrays (GBD, GCE, GDF, GEB, GFC) have systematic errors, which are periodically arranged according to the baseline arrangement of the interferometer array. This causes the two-dimensional positioning results of the five sets of three-antenna interferometer arrays (GBD, GCE, GDF, GEB, GFC) for the same radiation source Q to not intersect at Q.

For example, continuing as shown in FIG. 7a, the central azimuth angles and central elevation angles of the five rays leading from the antenna G point towards Q are assumed, which can be expressed by equation (4):

$$Az' = \frac{1}{N}\sum_{i=1}^{N} Az_i' \atop El' = \frac{1}{N}\sum_{i=1}^{N} El_i', \quad N = 5 \quad (4)$$

where N is the number of three-antenna interferometer arrays. Under ideal conditions, (Az_0, El_0) and (Az', El') should intersect at Q, but due to the random positioning error caused by the 2.5 ns time resolution at a 400M sampling rate, Q and Q' do not overlap, meaning that (Az_0, El_0) and (Az', El') cannot intersect.

Figure 7B:
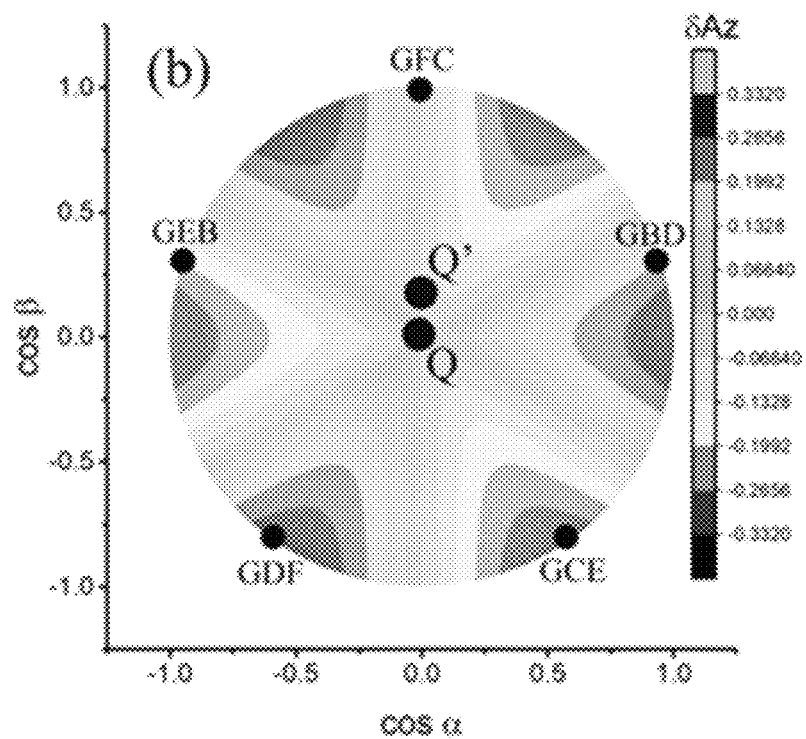
FIG. 7b shows a schematic diagram of which target azimuth angles obtained by five sets of three-antenna interferometer arrays centered around antenna G are uniformly distributed around a true azimuth angle of radiation source Q in the embodiments of the present disclosure.
Figure 7C:
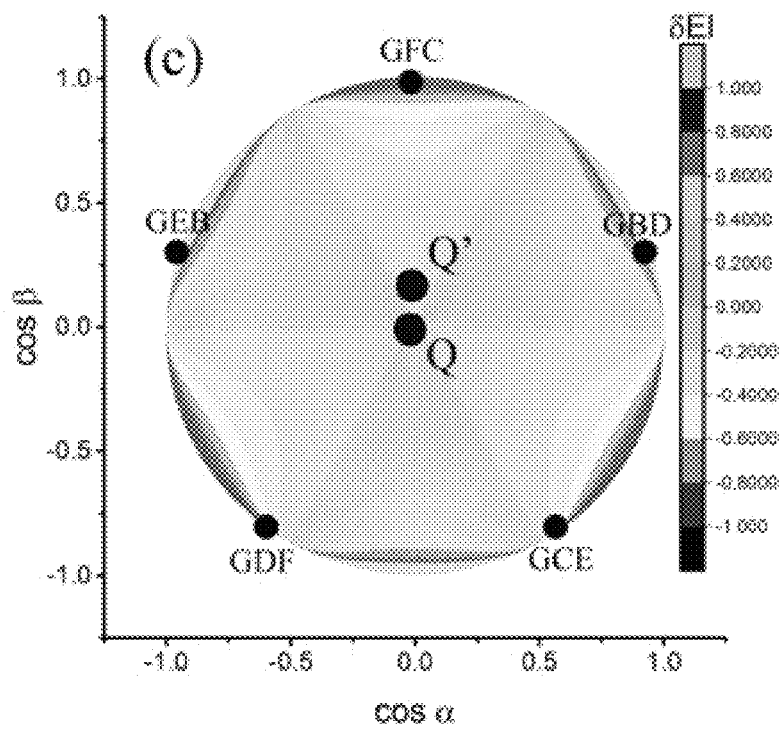
FIG. 7c shows a schematic diagram of which target elevation angles obtained by the five sets of three-antenna interferometer arrays centered around antenna G are uniformly distributed around the true elevation angle of the radiation source Q in the embodiments of the present disclosure.

However, in the embodiment of the present disclosure, based on the arrangement scheme shown in FIG. 1, the target azimuth angles and target elevation angles ($Az_i'$, $El_i'$; i= 1, 2 . . . 5) obtained by the five sets of three-antenna interferometer arrays (GBD, GCE, GDF, GEB, GFC) can stably distribute around the true position of the radiation source Q. As shown in FIGS. 7b and 7c, FIG. 7b shows a schematic diagram of which target azimuth angles obtained by five sets of three-antenna interferometer arrays centered around antenna G are uniformly distributed around a true azimuth angle of radiation source Q in the embodiments of the present disclosure, and FIG. 7c shows a schematic diagram of which target elevation angles obtained by the five sets of three-antenna interferometer arrays centered around antenna G are uniformly distributed around the true elevation angle of the radiation source Q in the embodiments of the present disclosure. Therefore, the two-dimensional direction (Az_0, El_0) obtained by the six-antenna interferometer array ABCDEF can be used as the reference direction, that is, the direction OQ in FIG. 7a is the reference direction. To find the coordinates of the point on $L_1$ when ray $L_2$ (Az', El') is closest to ray $L_1$ (Az_0, El_0) is the three-dimensional coordinates (x, y, z) of the radiation source Q that is required to solve. Therefore, the above step b1 to step b3 can be understood as follows.

Using the origin O of coordinates as the starting point, the first azimuth angle and first elevation angle (Az_0, El_0) as the direction vector (denoted as $\vec{d_1}$) and the to-be-solved parameter (denoted as t), the first to-be-solved ray expression $L_1$ can be constructed and expressed as: A+t·$\vec{d_1}$, where A is the coordinate of the origin O of coordinates.

Using antenna G as the starting point, the central azimuth angle and central elevation angle of all the target azimuth angles and target elevation angles (denoted as $\vec{d_2}$) as the direction vector, and the parameter s related to the to-be-solved parameter t, the second to-be-solved ray expression $L_2$ can be constructed and expressed as: B+s·$\vec{d_2}$, where s is a function of t.

Then, the distance function can be expressed as: ||(A+t·$\vec{d_1}$)−(B+s·$\vec{d_2}$)||. This is a common nonlinear optimization problem that can be solved using existing methods, which will not be elaborated here. By finding the optimal to-be-solved parameter t that minimizes the distance function, the corresponding point on $L_1$ can be calculated, i.e., A+t·$\vec{d_1}$. Thus, the true three-dimensional coordinates (x, y, z) of the radiation source Q can be obtained.

Furthermore, after determining the three-dimensional coordinates of the radiation source, the time at which a lightning event (i.e., the emission of a very high frequency radiation signal) occurs at a radiation source can also be determined. Therefore, for step S205, the embodiment can be: using the calculated coordinate Q (x, y, z), and using the time at which the VHF radiation signal is transmitted from the radiation source Q to the antenna A at the speed of light, to calculate the occurrence time $t_0$ of the radiation source, and ultimately complete the spatiotemporal positioning of the radiation event, which is represented as Q ($t_0$, x, y, z).

From the above embodiments, it can be seen that the ultra-short baseline lightning positioning method based on the multi-antenna single-station three-dimensional arrangement provided by the present disclosure has the following advantages.

First, the embodiment of the present disclosure employs high-sensitivity radiation signal receiving antennas with ultra-wideband (50-180 MHz), and employs two high-speed data acquisition cards with a sampling frequency of 400M and a sampling precision of 14 bits. The time resolution for the detected lightning discharge events is extremely high, which can reach the nanosecond level. Combined with signal processing and matching technologies, it can obtain ultra-fine three-dimensional channels and development characteristics of the lightning discharge process with nanosecond resolution.

Second, the embodiment of the present disclosure provides a single-station multi-antenna stereoscopic-arrangement scheme of the ultra-short baseline, which fully utilizes the characteristics of the systematic error of the interferometer arrays with different numbers of antennas. That is, the six-antenna regular polygon interferometer array has zero systematic error, and the three-antenna equilateral triangle interferometer array has periodically distributed systematic errors. Using the multi-antenna combination-interference positioning and intersecting technology provided by the present disclosure, the three-dimensional spatial position and timing when the lightning VHF radiation signal occurs can be accurately obtained.

Furthermore, the embodiment of the present disclosure employs ultra-high-rate upsampling technology to process the original observation signal. Then, the DBM_EEMD technology is applied to the upsampled signal for optimization and band-pass filtering, enhancing cross-correlation matching technology that combines the main window and variable scale auxiliary window. This process not only improves the time resolution of the VHF radiation signal but also greatly enhances the accuracy of waveform cross-correlation matching.

Finally, compared with the centroid method commonly used in traditional lightning positioning technology, the embodiments of the present disclosure provide a new pulse matching technology, i.e., a method for signal matching based on a variable-scale window and pulse extraction in a micro-scale window, which can accurately match and locate each pulse event in the lightning VHF radiation signal. The method significantly improves the ability to identify and locate lightning discharge events. By using various combinations of different numbers of antennas to obtain two-dimensional positioning information from six sets of interferometer arrays and performing coordinate correction, and ultimately using the multi-interferometer array intersection technology to achieve precise three-dimensional positioning of the lightning radiation signal, richer and more accurate lightning discharge information can be obtained, compared to the traditional two-dimensional positioning method of interferometer arrays and long-baseline lightning positioning systems.

Figure 8:
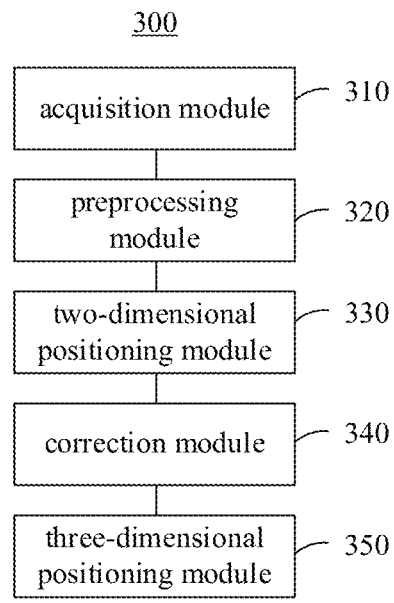
FIG. 8 shows a functional module diagram of a multi-antenna single-station stereoscopic-arrangement ultra-short baseline lightning location device 300 provided by the embodiments of the present disclosure.

Based on the same inventive conception as FIG. 2, the embodiments of the present disclosure also provide a multi-antenna single-station stereoscopic-arrangement ultra-short baseline lightning location device 300. Referring to FIG. 8, FIG. 8 shows a functional module diagram of a multi-antenna single-station stereoscopic-arrangement ultra-short baseline lightning location device 300 provided by the embodiments of the present disclosure, including an acquisition module 310, a preprocessing module 320, a two-dimensional positioning module 330, a correction module 340, and a three-dimensional positioning module 350.

The acquisition module 310 is configured for collecting very high frequency radiation signals received by each VHF antenna. The preprocessing module 320 is configured for determining a time difference of a same pulse signal between different VHF antennas based on the very high frequency radiation signals.

The two-dimensional positioning module 330 is configured for using, based on the time difference of the same pulse signal between different VHF antennas, the equilateral pentagon interferometer array and the equilateral triangle interferometer arrays to perform positioning by the interferometer, respectively; and obtaining a set of first azimuth angle and first elevation angle and multiple sets of second azimuth angles and second elevation angles of a radiation source emitting the very high frequency radiation signals, wherein the first azimuth angle and the first elevation angle are free of systematic error, and the second azimuth angles and the second elevation angles have systematic error.

The correction module 340 is configured for correcting the multiple sets of second azimuth angles and second elevation angles to obtain multiple sets of target azimuth angles and target elevation angles.

The three-dimensional positioning module 350 is configured for using a direction in which the first azimuth angle and first elevation angle are located as a reference direction, determining a target position point on the reference direction such that a central distance, between a ray in the reference direction and rays in a reference direction determined by the multiple sets of target azimuth angles and target elevation angles, is minimized; and determining a three-dimensional coordinate of the radiation source based on the target position point, the first azimuth angle, and the second azimuth angles.

The three-dimensional positioning module 350 is further configured for determining an occurrence time of the very high frequency radiation signals based on the three-dimensional coordinate and a time that the very high frequency radiation signals are transmitted at a speed of light to a central VHF antenna.

It is to be understood that the acquisition module 310, the preprocessing module 320, the two-dimensional positioning module 330, the correction module 340, and the three-dimensional positioning module 350 provided by the embodiments of the present disclosure can synergistically perform the various steps in FIG. 2 to achieve the corresponding technical effect.

In optional embodiments, seven VHF antennas are provided, comprising antenna A to antenna G, respectively. Antenna A is the central VHF antenna and is positioned directly above an origin of coordinates. Antenna B to antenna F are arranged around the origin of coordinates and are equidistant from the origin of coordinates. Antenna B to antenna F form a highly symmetrical equilateral pentagon, and antenna A to antenna F form a set of the equilateral pentagon interferometer array. Antenna A, together with two neighboring antennas from antenna B to antenna F, forms an equilateral triangle. Antenna G is located directly above antenna A, and a height of antenna G from the origin of coordinates enables that antenna G, together with two antennas spaced apart in antenna B to antenna F, forms five sets of equilateral triangle interferometer array.

In optional embodiments, the three-dimensional positioning module 350 is specifically configured for: using a direction in which the first azimuth angle and first elevation angle are located as a reference direction, determining a target position point on the reference direction such that a central distance, between a ray passing through the target position point in the reference direction and rays in a reference direction determined by the multiple sets of target azimuth angles and target elevation angles, is minimized, and determining a three-dimensional coordinate of the radiation source based on the target position point, the first azimuth angle, and the second azimuth angle, which comprises: determining a first to-be-solved ray expression by taking the origin of coordinates as a starting point, and the first azimuth angle and the first elevation angle as a direction vector; determining a second to-be-solved ray expression by taking the antenna G as a starting point, and a central azimuth angle and a central elevation angle of all the target azimuth angles and the target elevation angles as a direction vector, wherein both the first to-be-solved ray expression and the second to-be-solved ray expression comprise to-be-solved parameters; constructing a distance function between the first to-be-solved ray expression and the second to-be-solved ray expression, and performing nonlinear optimization on the distance function to determine a target parameter that minimize a function value of the distance function; and solving the first to-be-solved ray expression based on the target parameter to obtain the three-dimensional coordinate of the radiation source.

In optional embodiments, the correction module 340 is specifically configured for: rotating each set of the second azimuth angle and the second elevation angle by using polar coordinates between a cosine plane formed by the five sets of equilateral triangle interferometer arrays and a cosine plane formed by the equilateral pentagon interferometer array; and taking each set of the corrected second azimuth angle and second elevation angle as the target azimuth angle and target elevation angle.

In optional embodiments, the acquisition module 310 is specifically configured for collecting the very high frequency radiation signals received by each VHF antenna through an acquisition card, and the preprocessing module 320 is specifically configured for performing preprocessing on the collected very high frequency radiation signals; and performing signal matching on the preprocessed very high frequency radiation signals received by all the VHF antennas to determine a peak time when the same pulse signal arrives at each VHF antenna, and determining the time difference based on the peak time corresponding to each of two different VHF antennas.

In optional embodiments, the preprocessing module 320 is specifically configured for analyzing the very high frequency radiation signals to obtain a background noise signal and a main component of the very high frequency radiation signals with noise; using a multi-phase filter to perform high-rate upsampling on original signals, so as to enhance a time precision of the signals and alter a non-differentiable characteristic of the original signals; and constructing a band-pass filter to filter the very high frequency radiation signals, so as to retain high-frequency signal components.

In optional embodiments, the preprocessing module 320 is specifically configured for using generalized cross-correlation technology to match the very high frequency radiation signals on different VHF antennas, wherein during a matching process, a to-be-matched signal on each VHF antenna consists of one main window and two auxiliary windows; for the to-be-matched signal of a central antenna, values of its two auxiliary windows are set to 0; and for other VHF antennas except for the center antenna, a scale of the auxiliary window is determined by a length of the baseline formed with the central antenna; using a micro-scale window whose width is a preset value to traverse matching results, and determining, when a number of pulse peaks within the micro-scale window is consistent with a number of the VHF antennas, that pulses on all the VHF antennas are detected; and performing similarity judgment on waveforms of the pulses detected on all the VHF antennas; extracting, when a correlation coefficient of the pulses on each two VHF antennas is greater than a preset threshold value, the peak times of the pulses on all the VHF antennas, and determining the time difference based on the peak times corresponding to two different VHF antennas.

It should be noted that the division of modules in the above embodiments of the present disclosure is schematic and is only a logical functional division. There can be another division when actually implemented. Further, each functional unit in each embodiment of the present disclosure can be integrated into a single processing unit, and can be physically present separately; or, two or more units can be integrated into a single unit. The above integrated units can be implemented either in the form of hardware or in the form of software functional units.

Based on the schematic diagram of the multi-antenna single-station stereoscopic arrangement shown in FIG. 1 and the inventive concept shown in FIG. 2, the embodiments of the present disclosure also provide an ultra-short baseline lightning three-dimensional positioning system with a multi-antenna single-station stereoscopic arrangement, which multiple very high frequency (VHF) antennas and computer equipment, wherein the multi-antenna single-station stereoscopic arrangement comprises an interferometer array formed by combinations of different numbers of the VHF antennas, wherein the interferometer array comprises an equilateral pentagon interferometer array without angular error and multiple equilateral triangle interferometer arrays with angular error. The multiple VHF antennas are configured for receiving the very high frequency radiation signals and transmitting to the computer equipment, and the computer equipment is configured for executing the multi-antenna single-station stereoscopic-arrangement ultra-short baseline lightning location method provided in the embodiments of the present disclosure.

Based on the embodiment shown in FIG. 2, the embodiments of the present disclosure also provide computer equipment 400, wherein the computer equipment 400 is configured to perform the multi-antenna single-station stereoscopic-arrangement ultra-short baseline lightning location method provided by the embodiments of the present disclosure.

Figure 9:
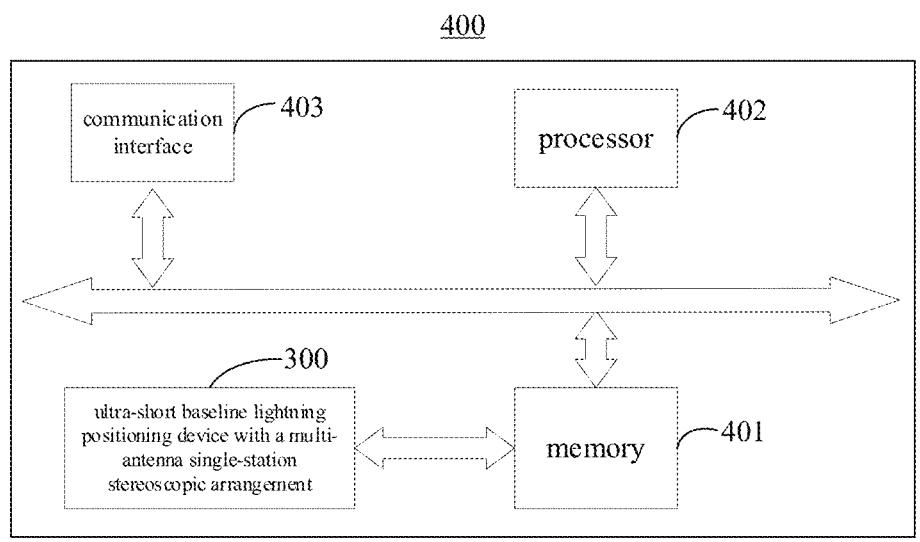
FIG. 9 shows a structural block diagram of computer equipment 400 provided by the embodiments of the present disclosure.

Referring to FIG. 9, FIG. 9 shows a structural block diagram of computer equipment 400 provided by the embodiments of the present disclosure. The computer equipment 400 includes: a memory 401, a processor 402, a communication interface 403, and a bus 404, wherein the memory 401, the processor 402, and the communication interface 403 are electrically connected to each other, directly or indirectly, to enable the transmission or interaction of data. For example, these components can be electrically connected to each other through one or more communication buses or signal lines.

Optionally, the bus 404 can be a peripheral component interconnect (PCI) bus or an extended industry standard architecture (EISA) bus, among others. The bus can be divided into address bus, data bus, control bus, etc. For ease of representation, only one bold line is used in FIG. 9, but it does not indicate that there is only one bus or one type of bus.

In the embodiments of the present disclosure, the processor 402 can be a general-purpose processor, a digital signal processor, a special-purpose integrated circuit, a field-programmable gate array or other programmable logic device, a discrete gate or transistorized logic device, a discrete hardware component, which can implement or perform each of the methods, steps, and logic block diagrams disclosed in embodiments of the present disclosure. The general-purpose processor can be a microprocessor or any conventional processor and so on. The steps of the method disclosed in the embodiments of the present disclosure can be directly implemented as hardware processes by a processor, or a combination of hardware and software modules within a processor. The software module can be located in the memory 401, and the processor 402 reads the program instructions in the memory 401 to complete the steps of the method described above in conjunction with its hardware.

In the embodiments of the present disclosure, the memory 401 can be a non-volatile memory, such as a hard disk drive (HDD) or a solid-state drive (SSD), etc., or it can be a volatile memory, such as RAM. The memory can also be, but is not limited to, any other medium capable of being configured to carry or store desired program code having the form of instructions or data structures and capable of being accessed by a computer. The memory in the embodiments of the present disclosure can also be a circuit or any other device capable of realizing a storage function, which is configured for storing instructions and/or data.

The memory 401 can be configured to store software programs and modules, such as the instructions/modules of the ultra-short baseline lightning positioning device 300 with a multi-antenna single-station stereoscopic arrangement as provided in the embodiments of the present disclosure, which can be stored in the memory 401 in the form of software or firmware or in the operating system (OS) of the solidified computer device 400. The processor 402 performs various functional applications and data processing by executing the software programs and modules stored in the memory 401. The communication interface 403 can be configured for communication of signaling or data with other nodes or devices.

It will be clear to those skilled in the field that, for the convenience and brevity of the description, the specific working processes of the devices and units described above can be referred to the corresponding processes in the preceding method embodiments and will not be repeated here.

Understandably, the structure shown in FIG. 9 is illustrative only, and the computer equipment 400 can also include more or fewer components than shown in FIG. 9, or have a different configuration than shown in FIG. 9. The components shown in FIG. 9 can be implemented using hardware, software, or a combination thereof.

The computing device 400 can be any kind of electronic product that allows human-computer interaction with a user, such as, for example, a personal computer, a tablet computer, a smart phone, a personal digital assistant (PDA), a game console, an interactive Internet protocol television (IPTV), a smart wearable device, and the like.

The computer equipment 400 can also include a network device and/or a user device. Network devices include, but are not limited to, a single network server, a group of servers comprising a plurality of network servers, or a cloud comprising a large number of hosts or network servers based on cloud computing.

The network on which the computer equipment 400 is located includes, but is not limited to, the Internet, wide area network, metropolitan area network, local area network, virtual private network (VPN), and so on.

Based on the above embodiments, the present disclosure also provides a storage medium. A computer program is stored in the computer-readable storage medium. The computer program, when executed by the computer, enables the computer to execute the multi-antenna single-station stereoscopic-arrangement ultra-short baseline lightning location method provided in the above embodiments.

Based on the above embodiments, the embodiments of the present disclosure also provide a computer program. When the computer program is run on a computer, it enables the computer to execute the multi-antenna single-station stereoscopic-arrangement ultra-short baseline lightning location method provided in the above embodiments.

Based on the above embodiments, the embodiments of the present disclosure also provide a chip. The chip is configured to read a computer program stored in a memory, and configured to execute the multi-antenna single-station stereoscopic-arrangement ultra-short baseline lightning location method provided in the above embodiments.

The embodiments of the present disclosure also provide a computer program product comprising instructions, which, when run on a computer, enables the computer to execute the multi-antenna single-station stereoscopic-arrangement ultra-short baseline lightning location method provided in the above embodiments.

The embodiments of the present disclosure are described with reference to flowcharts and/or block diagrams illustrating methods, devices (systems), and computer program products according to embodiments of the present disclosure. It should be understood that each process and/or block in the flowchart and/or block diagram, and the combinations of processes and/or blocks in the flowchart and/or block diagram, can be implemented by instructions. The provided instructions can be executed by a general-purpose computer, a dedicated computer, an embedded processor, or any processors of other programmable data processing devices to generate a machine that, when the instructions are executed by the processor of the computer or other programmable data processing device, implements the functionality specified in the one or more processes in the flowchart and/or one or more boxes in the block diagram.

These computer program instructions can also be stored in a computer-readable memory that is capable of booting a computer or other programmable data processing device to work in a specific manner. The instructions stored in the computer-readable memory are enabled to generate a product comprising an instruction apparatus. The instruction apparatus implements the functionality specified in one or more processes in the flowchart and/or one or more boxes in the block diagram.

These computer program instructions can also be loaded onto a computer or another programmable data processing device so as to allow the computer or other programmable device to execute a series of operational steps to produce processing implemented by the computer. The instructions executed on the computer or other programmable device provide steps for implementing the functionality specified in one or more processes in the flowchart and/or one or more boxes in the block diagram.

The above are just specific embodiments of the present disclosure, but the scope of protection of the present disclosure is not limited to the embodiments. Any variations or substitutions readily apparent to those skilled in the art within the technical scope disclosed in the present disclosure should be encompassed within the scope of protection of the present disclosure. Therefore, the scope of protection of the present disclosure should be determined by the scope of protection of the claims.

What is claimed is:

1. A multi-antenna single-station stereoscopic-arrangement ultra-short baseline lightning location method, wherein the multi-antenna single-station stereoscopic arrangement comprises an interferometer array formed by combinations of different numbers of very high frequency (VHF) antennas, wherein the interferometer array comprises an equilateral pentagon interferometer array without angular error and multiple equilateral triangle interferometer arrays with angular error, wherein seven VHF antennas are provided, comprising antenna A to antenna G, respectively; the antenna A is a central VHF antenna and is positioned directly above an origin of coordinates; the antenna B to the antenna F are arranged around the origin of coordinates and are equidistant from the origin of coordinates; the antenna B to the antenna F form a highly symmetrical equilateral pentagon, and the antenna A to the antenna F form a set of the equilateral pentagon interferometer array; the antenna A, together with two neighboring antennas from the antenna B to the antenna F, forms an equilateral triangle; the antenna G is located directly above the antenna A; and a height of the antenna G from the origin of coordinates enables that the antenna G, together with two antennas spaced apart in the antenna B to the antenna F, forms five sets of equilateral triangle interferometer arrays; and the method comprises:

collecting very high frequency radiation signals received by each VHF antenna, and determining a time difference of a same pulse signal between different VHF antennas based on the very high frequency radiation signals;

using, based on the time difference of the same pulse signal between different VHF antennas, the equilateral pentagon interferometer array and the equilateral triangle interferometer arrays to perform positioning, respectively, and obtaining a set of first azimuth angle and first elevation angle and multiple sets of second azimuth angles and second elevation angles of a radiation source emitting the very high frequency radiation signals, wherein the first azimuth angle and first elevation angle are free of systematic error, and the multiple second azimuth angles and second elevation angles have systematic error;

correcting the multiple sets of second azimuth angles and second elevation angles to obtain multiple sets of target azimuth angles and target elevation angles;

using a direction in which the first azimuth angle and first elevation angle are located as a reference direction, determining one target position point on the reference direction such that a central distance, between a ray passing through the target position point in the reference direction and rays in a reference direction determined by the multiple sets of target azimuth angles and target elevation angles, is minimized, and determining a three-dimensional coordinate of the radiation source based on the target position point, the first azimuth angle, and the second azimuth angles; and determining an occurrence time of the very high frequency radiation signals based on the three-dimensional coordinate and a time that the very high frequency radiation signals are transmitted at a speed of light to a central VHF antenna.

2. The multi-antenna single-station stereoscopic-arrangement ultra-short baseline lightning location method according to claim 1, wherein the step of using a direction in which the first azimuth angle and first elevation angle are located as a reference direction, determining one target position point on the reference direction such that a central distance, between a ray passing through the target position point in the reference direction and rays in a reference direction determined by the multiple sets of target azimuth angles and target elevation angles, is minimized, and determining a three-dimensional coordinate of the radiation source based on the target position point, the first azimuth angle, and the second azimuth angles, comprises:

determining a first to-be-solved ray expression by taking the origin of coordinates as a starting point, and the first azimuth angle and the first elevation angle as a direction vector; determining a second to-be-solved ray expression by taking the antenna G as a starting point, and a central azimuth angle and a central elevation angle of all the target azimuth angles and target elevation angles as a direction vector, wherein both the first to-be-solved ray expression and the second to-be-solved ray expression comprise to-be-determined parameters;

constructing a distance function between the first to-be-solved ray expression and the second to-be-solved ray expression, and performing nonlinear optimization on the distance function to determine a target parameter that minimizes a function value of the distance function; and solving the first to-be-solved ray expression based on the target parameter to obtain the three-dimensional coordinate of the radiation source.

3. The multi-antenna single-station stereoscopic-arrangement ultra-short baseline lightning location method according to claim 1, wherein the step of correcting the multiple sets of second azimuth angles and second elevation angles to obtain multiple sets of target azimuth angles and target elevation angles, comprises:

rotating each set of second azimuth angle and second elevation angle by using polar coordinates between a cosine plane formed by the five sets of equilateral triangle interferometer arrays and a cosine plane formed by the equilateral pentagon interferometer array; and taking each set of corrected second azimuth angle and second elevation angle as a target azimuth angle and a target elevation angle.

4. The multi-antenna single-station stereoscopic-arrangement ultra-short baseline lightning location method according to claim 1, wherein the step of collecting very high frequency radiation signals received by each VHF antenna, and determining a time difference of a same pulse signal between different VHF antennas based on the very high frequency radiation signals, comprises collecting the very high frequency radiation signals received by each VHF antenna through an acquisition card, and performing preprocessing on the very high frequency radiation signals; and performing signal matching on preprocessed very high frequency radiation signals received by all VHF antennas to determine a peak time when the same pulse signal arrives at each VHF antenna, and determining the time difference based on a peak time corresponding to each of two different VHF antennas.

5. The multi-antenna single-station stereoscopic-arrangement ultra-short baseline lightning location method according to claim 4, wherein the step of performing preprocessing on the very high frequency radiation signals after clock synchronization comprises:

analyzing the very high frequency radiation signals to obtain a background noise signal and a main component of the very high frequency radiation signals with noise;

using a multi-phase filter to perform high-rate upsampling on original signals, so as to enhance a time precision of the signals and alter a non-differentiable characteristic of the original signals; and constructing a band-pass filter to filter the very high frequency radiation signals, so as to retain high-frequency signal components.

6. The multi-antenna single-station stereoscopic-arrangement ultra-short baseline lightning location method according to claim 4, wherein the step of performing signal matching on preprocessed very high frequency radiation signals received by all VHF antennas to determine a peak time when the same pulse signal arrives at each VHF antenna, and determining the time difference based on a peak time corresponding to each of two different VHF antennas, comprises:

using generalized cross-correlation technology to match the very high frequency radiation signals on different VHF antennas, wherein during a matching process, a to-be-matched signal on each VHF antenna consists of one main window and two auxiliary windows; for a to-be-matched signal of a central antenna, values of its two auxiliary windows are set to 0; and for other VHF antennas except for the center antenna, a scale of the auxiliary windows is determined by a length of a baseline formed with the central antenna;

using a micro-scale window whose width is a preset value to traverse matching results, and determining, when a number of pulse peaks within the micro-scale window is consistent with a number of the VHF antennas, that pulses on all the VHF antennas are detected; and performing similarity judgment on waveforms of the pulses detected on all the VHF antennas;

extracting, when a correlation coefficient of pulses on each two VHF antennas is greater than a preset threshold value, the peak times of the pulses on all the VHF antennas, and determining the time difference based on peak times corresponding to two different VHF antennas.

7. A multi-antenna single-station stereoscopic-arrangement ultra-short baseline lightning location device, wherein the multi-antenna single-station stereoscopic arrangement comprises an interferometer array formed by combinations of different numbers of VHF antennas, wherein the interferometer array comprises an equilateral pentagon interferometer array without angular error and multiple equilateral triangle interferometer arrays with angular error, wherein seven VHF antennas are provided, comprising antenna A to antenna G, respectively; the antenna A is a central VHF antenna and is positioned directly above an origin of coordinates; the antenna B to the antenna F are arranged around the origin of coordinates and are equidistant from the origin of coordinates; the antenna B to the antenna F form a highly symmetrical equilateral pentagon, and the antenna A to the antenna F form a set of the equilateral pentagon interferometer array; the antenna A, together with two neighboring antennas from the antenna B to the antenna F, forms an equilateral triangle; and the antenna G is located directly above the antenna A, and a height of the antenna G from the origin of coordinates enables that the antenna G, together with two antennas spaced apart in the antenna B to the antenna F, forms five sets of equilateral triangle interferometer arrays; and the device comprises:

an acquisition module, configured for collecting very high frequency radiation signals received by each VHF antenna; a preprocessing module, configured for determining a time difference of a same pulse signal between different VHF antennas based on the very high frequency radiation signals;

a two-dimensional positioning module, configured for using, based on the time difference of the same pulse signal between different VHF antennas, the equilateral pentagon interferometer array and the equilateral triangle interferometer arrays to perform positioning by interferometer, respectively; and obtaining a set of first azimuth angle and first elevation angle and multiple sets of second azimuth angles and second elevation angles of a radiation source emitting the very high frequency radiation signals, wherein the first azimuth angle and the first elevation angle are free of systematic error, and the multiple second azimuth angles and second elevation angles have systematic error;

a correction module, configured for correcting the multiple sets of second azimuth angles and second elevation angles to obtain multiple sets of target azimuth angles and target elevation angles; and a three-dimensional positioning module, configured for using a direction in which the first azimuth angle and the first elevation angle are located as a reference direction, determining one target position point on the reference direction such that a central distance, between a ray in the reference direction and rays in a reference direction determined by the multiple sets of target azimuth angles and target elevation angles, is minimized; and determining a three-dimensional coordinate of the radiation source based on the target position point, the first azimuth angle, and the second azimuth angles; and the three-dimensional positioning module is further configured for determining an occurrence time of the very high frequency radiation signals based on the three-dimensional coordinate and a time that the very high frequency radiation signals are transmitted at a speed of light to a central VHF antenna.

8. A multi-antenna single-station stereoscopic-arrangement ultra-short baseline lightning three-dimensional location system, comprising multiple very high frequency (VHF) antennas and computer equipment, wherein the multi-antenna single-station stereoscopic arrangement comprises an interferometer array formed by combinations of different numbers of the VHF antennas; the interferometer array comprises an equilateral pentagon interferometer array without angular error and multiple equilateral triangle interferometer arrays with angular error; the multiple VHF antennas are configured for receiving very high frequency radiation signals and transmitting to the computer equipment; and the computer equipment is configured for executing the multi-antenna single-station stereoscopic-arrangement ultra-short baseline lightning location method according to claim 1.

* * * * *